United States Patent
Zou et al.

(10) Patent No.: US 9,771,684 B2
(45) Date of Patent: Sep. 26, 2017

(54) WOVEN FABRIC BELT FOR A FIBROUS-WEB MACHINE

(71) Applicant: VOITH PATENT GMBH, Heidenheim (DE)

(72) Inventors: Juanhao Zou, Shreveport, LA (US); Scott D. Quigley, Bossier City, LA (US)

(73) Assignee: Voith Patent GmbH, Heidenheim (DE)

(*) Notice: Subject to any disclaimer, the term of this patent is extended or adjusted under 35 U.S.C. 154(b) by 0 days.

(21) Appl. No.: 15/104,282

(22) PCT Filed: Dec. 12, 2014

(86) PCT No.: PCT/EP2014/077532
§ 371 (c)(1),
(2) Date: Jun. 14, 2016

(87) PCT Pub. No.: WO2015/091253
PCT Pub. Date: Jun. 25, 2015

(65) Prior Publication Data
US 2016/0312407 A1    Oct. 27, 2016

Related U.S. Application Data

(60) Provisional application No. 61/917,053, filed on Dec. 17, 2013.

(30) Foreign Application Priority Data

Dec. 17, 2013 (DE) .......................... 10 2013 226 324

(51) Int. Cl.
*D21F 1/00* (2006.01)
*B29C 65/16* (2006.01)

(52) U.S. Cl.
CPC ............ *D21F 1/0054* (2013.01); *B29C 65/16* (2013.01)

(58) Field of Classification Search
CPC .......... D21F 1/00; D21F 1/0054; B29C 65/16

USPC ........................................................ 162/289
See application file for complete search history.

(56) References Cited

U.S. PATENT DOCUMENTS

| | | |
|---|---|---|
| 4,501,782 A | 2/1985 | Weatherly et al. |
| 7,381,307 B2 | 6/2008 | Silakoski |
| 8,062,480 B2 | 11/2011 | Eagles |
| 2007/0028997 A1 | 2/2007 | Best et al. |
| 2009/0139599 A1 | 6/2009 | Eagles |
| 2015/0096704 A1 | 4/2015 | Straub et al. |

FOREIGN PATENT DOCUMENTS

| | | |
|---|---|---|
| DE | 102010043458 A1 | 5/2012 |
| EP | 1749924 A1 | 2/2007 |
| WO | 2004055265 A1 | 7/2004 |
| WO | 2013160194 A1 | 10/2013 |

OTHER PUBLICATIONS

DE 10 2010 043458, Eberhardt et al., Oct. 2012, machine translation.*

* cited by examiner

*Primary Examiner* — Mark Halpern
(74) *Attorney, Agent, or Firm* — Laurence A. Greenberg; Werner H. Stemer; Ralph E. Locher (57) ABSTRACT

A woven-fabric belt for a fibrous web machine includes longitudinal and cross threads forming crossing points, top and bottom sides and a seam segment. Each longitudinal thread has end segments with ends. A segment is formed by weaving end segments with cross threads. Some end segments follow a weaving path with the cross threads, along which an end segment forms floats on the sides in alternation in direction of the thread end and a float is disposed on the bottom side between two adjacent floats on the top side and vice versa. A last float before the thread end is formed on one side and the end segment switches from one side to the other following the last float before the thread end. The end segment is bonded to a cross thread at one thread crossing point in one float lying before the last float in the weaving path.

16 Claims, 5 Drawing Sheets

WOVEN FABRIC BELT FOR A FIBROUS-WEB MACHINE

This application is a 371 of PCT/EP2014/077532 filed 12 Dec. 2014.

BACKGROUND OF THE INVENTION

Field of the Invention

The invention relates to a woven-fabric belt which is suitable for employment in a machine producing and/or processing a fibrous web, in particular a paper, cardboard, tissue or non-woven machine.

Woven-fabric belts of the generic type comprise longitudinal threads which are interwoven with cross threads, while configuring thread intersection points. Such woven-fabric belts are typically manufactured in a flat weave and have an upper side and a lower side opposite thereto. In the intended use of such woven-fabric tapes in the machine, the longitudinal threads run in the MD direction, and the cross threads run in the CMD direction of the machine. Furthermore, the upper side points toward the fibrous web, and the lower side toward the machine. For employment in a machine producing and/or processing a fibrous web such woven-fabric belts which are originally produced in a flat shape are rendered endless on a woven-fabric seam region such that said woven-fabric belts are able to be operated as endless belts in the machine. Such a woven-fabric seam region may be provided by longitudinal threads which in the region of the longitudinal thread end portions thereof are woven in reverse so as to configure seam loops, for example. Such a woven-fabric seam region may also be formed by longitudinal thread end portions of longitudinal threads which are each gathered in pairs and which, while configuring a woven seam fabric having cross threads which often is identical to the flat-woven fabric portion are collectively interwoven with cross threads, often in portions along a common weaving path.

The tensile strength of the seam in the case of woven-fabric seam regions formed by seam loops as well as in those formed by the woven seam fabric depends inter alia on the number of cross threads with which the longitudinal thread end portions are interwoven during reverse weaving, or on the number of cross threads with which the gathered longitudinal thread end portions are collectively interwoven so as to follow a common weaving path. Here, the strength of the seam increases with the number of cross threads with which the longitudinal thread end portions are interwoven. However, physical properties such as, for example, the permeability and thickness of the woven-fabric belt, in the woven-fabric seam region are influenced by reverse weaving or by the common weaving path, respectively, such that these physical properties in the woven-fabric seam region vary from one location to another and are dissimilar to the remaining part of the woven-fabric belt.

In order for high tensile strength to be achieved, on the one hand, and for there to be no excessive variation in permeability and/or thickness, for example, on the other hand, it is proposed in the prior art that the longitudinal threads in the region of the longitudinal thread end portions thereof are connected in a materially integral manner to cross threads at least at some thread intersection points.

For example, in this way it is known from U.S. Pat. No. 8,062,480 and from EP1749924 for the longitudinal threads and cross threads to be connected in a materially integral manner at the thread intersection points by welding, using the influence of laser radiation.

However, it has now been demonstrated that the materially integral connection, for example the welded connection, between the longitudinal threads and cross threads at the thread intersection points is often inadequately durable. As has been demonstrated in research by the applicant, this issue arises in particular in the case of woven-fabric belts having an open and/or single-layer weaving structure. In order to produce a durable woven-fabric seam it has therefore been proposed that entire regions of the woven-fabric seam portion are connected in a materially integral manner, this in turn leading to undesirable rigidity of the woven-fabric belt in the longitudinal direction thereof.

BRIEF SUMMARY OF THE INVENTION

It is therefore the object of the present invention to propose a woven-fabric thread having an improved materially integral connection between the longitudinal threads and cross threads at thread intersection points.

The object is achieved by a woven-fabric belt which is suitable for employment in a machine producing and/or processing a fibrous web, having longitudinal threads which while configuring thread intersection points are interwoven with cross threads, and having an upper side and a lower side opposite thereto. In the case of the woven-fabric belt according to the invention, each longitudinal thread when viewed in the length thereof has two end-side longitudinal thread end portions having a respective thread end. The woven-fabric seam portion is formed by interweaving the longitudinal thread end portions with cross threads which are referred to as woven-fabric seam cross threads. Here, at least some of the longitudinal thread end portions upon interweaving with the woven-fabric cross threads follow a weaving path along which the respective longitudinal thread end portion when viewed in the direction toward the thread end thereof repeatedly and alternatingly configures floats on the upper side and floats on the lower side, one float on the lower side being disposed between two directly adjacent floats on the upper side, and one float on the upper side being disposed between two directly adjacent floats on the lower side. Furthermore, the weaving path has a last float before the thread end, which runs on one of the upper and lower side, wherein the longitudinal thread end portion, subsequent to the last float before the thread end, changes from the one of the upper and lower side to the other of the upper and lower side. Furthermore, the longitudinal thread end portion at least at one thread intersection point is connected in a materially integral manner to a woven-fabric seam cross thread.

The woven-fabric belt according to the invention is characterized in that the at least one thread intersection point at which the longitudinal thread end portion is connected in a materially integral manner to a woven-fabric seam cross thread is disposed in at least one float which in the weaving path lies before the last float.

Research by the applicant has demonstrated that inadequate contact between the longitudinal thread end portions and the woven-fabric seam cross threads at the thread intersection points is often responsible for an inadequate materially integral connection in the production of the materially integral connection. Research by the applicant has furthermore established that this issue arises in particular when the materially integral connection is produced at a thread intersection point in the last float before the thread end since the longitudinal thread end portion at this point is often no longer under sufficient tensile stress in order to be firmly pressed against the woven-fabric seam cross thread during the production of the materially integral connection at the thread intersection point.

On account of it being proposed by the invention that at least one thread intersection point of the at least one thread intersection point at which the longitudinal thread end portion is connected in a materially integral manner to a woven-fabric seam cross thread is disposed in a float which in a weaving path of said longitudinal thread end portion lies before the last float, the materially integral connection between the longitudinal thread end portion and at least one woven-fabric seam cross thread is produced at a thread intersection point at which the longitudinal thread end portion is still under sufficient tensile stress in order to be reliably pressed against the woven-fabric seam cross thread during the production of the materially integral connection. The materially integral connection is thus durable and firm, and the woven-fabric belt according to the invention has a seam of high strength. By providing a firm materially integral connection at the thread intersection points, the number of materially integral connection points may be significantly reduced while maintaining or improving strength in comparison with woven-fabric belts having a "non-targeted" selection of the thread intersection points which are connected in a materially integral manner.

It should be noted at this point that the respective longitudinal thread end portion, once the latter subsequent to the last float has been guided from the one side to the other side, is not interwoven with any further woven-fabric seam cross thread. This means that the longitudinal thread end portion before the thread end of the latter is not guided any more from the other side of upper and lower side to the one side of upper and lower side.

In the context of the present invention, a first and a second thread are mutually interwoven when the first thread continuously intersects the second thread on one side, and the first thread before and after the second thread in each case intersects at least one further thread on another side lying opposite the one side. Here, the at least one further thread need not be disposed so as to be directly adjacent to the second thread.

A float on the upper side is formed in that the longitudinal thread end portion on the upper side continuously intersects one or a plurality of directly adjacent woven-fabric seam cross threads, and a float on the lower side is formed in that the longitudinal thread end portion on the lower side continuously intersects one or a plurality of directly adjacent woven-fabric seam cross threads.

It may be assumed in the context of the invention that the longitudinal direction of the woven-fabric belt and the longitudinal direction of the longitudinal threads are mutually parallel or extend so as to deviate from one another by a maximum of +/−20°. Furthermore, it may be assumed in the context of the invention that the cross direction of the woven-fabric belt and the longitudinal direction of the cross threads are mutually parallel or extend so as to deviate from one another by a maximum of +/−20°. Furthermore, the longitudinal direction and the cross direction of the woven-fabric belt extend so as to be mutually orthogonal.

Advantageous design embodiments and refinements of the invention are stated in the dependent claims.

In the intended use of the woven-fabric belt in the machine, the longitudinal threads in particular by way of the longitudinal direction thereof run in the MD direction, and the cross threads by way of the longitudinal direction thereof run in the CMD direction of the machine, the upper side facing toward the fibrous web and the lower side facing toward the machine.

It goes without saying that the respective longitudinal thread end portion is connected in a materially integral manner to a plurality of woven-fabric seam cross threads. Therefore, one design embodiment of the invention provides that in the weaving path of the at least some longitudinal thread end portions the respective longitudinal thread end portion at thread intersection points is connected in a materially integral manner to further woven-fabric seam cross threads. This may also comprise a materially integral connection between a longitudinal thread end portion and a woven-fabric seam cross thread in the last float in the weaving path of the longitudinal thread end portion, as long as it is guaranteed that a materially integral connection is also produced in a float preceding the last float.

Here, the respective longitudinal thread end portion is preferably connected in a materially integral manner to a plurality of woven-fabric seam cross threads which are disposed in at least one float lying before the last float in the weaving path. The respective longitudinal thread end portion is preferably connected in a materially integral manner to all woven-fabric seam cross threads which are disposed in a float lying before the last float in the weaving path. On account thereof, a simple production of the materially integral connection is possible since the materially integral connection may be produced on directly adjacent woven-fabric seam cross threads.

According to one preferred design embodiment of the invention, it is provided that in the weaving path of the at least some longitudinal thread end portions the at least one thread intersection point at which the respective longitudinal thread end portion is connected in a materially integral manner to a woven-fabric seam cross thread is disposed in at least one of the floats which is one of the six, in particular one of the four, floats which directly precede the last float in the weaving path of the longitudinal thread end portion. It is achieved by this measure that the longitudinal thread end portion in the weaving path thereof up to the thread end does not cover an excessive distance across which the longitudinal thread end portion is not connected in a materially integral manner to a woven-fabric seam cross thread if and when a materially integral connection is produced only at a few thread intersection points in the weaving path of the respective longitudinal thread end portion.

In this context, it may be specifically provided that in the weaving path of the at least some longitudinal thread end portions the at least one thread intersection point at which the respective longitudinal thread end portion is connected in a materially integral manner to a woven-fabric seam cross thread is disposed in a float which is a penultimate float directly preceding the last float. Alternatively or additionally, it may be provided that in the weaving path of the at least some longitudinal thread end portions at least one thread intersection point at which the respective longitudinal thread end portion is connected in a materially integral manner to a woven-fabric seam cross thread is disposed in a float which is an antepenultimate float preceding the last float.

This measure is particularly purposeful in the case of woven fabric belts having an open and/or single-layer weaving structure since in the case of such woven-fabric belts the longitudinal thread end portions are often only loosely anchored in the woven fabric and the longitudinal thread end portions thus at least in part may egress from the woven fabric, and in particular may project beyond the upper side which faces toward the fibrous web and typically provides the web-contact side, or beyond the lower side which faces toward the machine and typically provides the machine-contact side.

In order for the egression of a thread end as described above to be suppressed, it may furthermore be purposeful that at least one of the further woven-fabric seam cross threads which at the thread intersection point is connected in a materially integral manner to the longitudinal thread end portion is disposed in the last float.

In order for the woven-fabric belt in the woven-fabric seam portion not to be rendered excessively rigid by the materially integral connection, it is particularly purposeful that not more than six, in particular not more than four, directly adjacent woven-fabric seam cross threads are connected in a materially integral manner to the respective longitudinal thread end portion. On account thereof, it is achieved that the permeability of the woven-fabric belt in the woven-fabric seam portion is not excessively reduced.

The weaving structure of a woven-fabric belt is often of such a design that floats of the longitudinal threads of dissimilar lengths are formed when the longitudinal threads are interwoven with the cross threads. Since, according to one preferred design embodiment of the invention, the weaving structure of the woven-fabric belt continues into the woven-fabric seam region, the longitudinal thread end portions in particular in such a case form floats of dissimilar lengths in the woven-fabric seam portion. Therefore, according to one preferred refinement of the invention, it is provided that in the weaving path of the at least some longitudinal thread end portions floats of dissimilar lengths are formed, wherein the at least one thread intersection point at which the respective longitudinal thread end portion is connected in a materially integral manner to a woven-fabric seam cross thread is disposed in a float which is of shorter length than other floats. Tests by the applicant have demonstrated that in the case of longer floats the longitudinal thread end portion runs across the woven-fabric seam cross threads in a more arcuate shape than in the case of shorter floats, and that therefore poorer contact often prevails at the thread intersection point between a woven-fabric seam cross thread and a longitudinal thread end portion in the case of longer floats as compared with shorter floats, on account of which a less durable materially integral connection is achieved in the case of the longer floats than in the case of the shorter floats. The durability of the materially integral connection is thus further increased by the above-mentioned measure. In this context it is particularly purposeful when the float of shorter length extends across at maximum four, in particular at maximum two directly adjacent woven-fabric seam cross threads. The length of a float of a longitudinal thread end portion is understood to be the number of woven-fabric seam cross threads which are continuously intersected by the longitudinal thread end portion on the same side of the woven-fabric seam cross threads.

The above-mentioned embodiment may also represent a separate invention according to which a woven-fabric belt having longitudinal threads which are interwoven with cross threads intersecting the former while configuring thread intersections points is claimed, the woven-fabric belt having an upper side and a lower side lying opposite thereto, wherein at least some of the longitudinal threads during interweaving with the cross threads follow a weaving path along which the respective longitudinal thread repeatedly and alternatingly configures floats on the upper side and lower side, wherein at least some of the floats are of dissimilar lengths, wherein the at least one thread intersection point at which the respective longitudinal thread end portion is connected in a materially integral manner to a woven-fabric seam cross thread is disposed in a float which is of a shorter length than that of other floats.

In order to increase contact between woven-fabric seam cross threads and a longitudinal thread end portion at the thread intersection point and thus to improve the materially integral connection, it may be purposeful that the at least some longitudinal threads and/or at least some woven-fabric seam cross threads have a flattened cross-sectional shape. This aspect too may represent a separate invention.

Woven-fabric belts are produced in a weaving process in which the warp or cross thread, respectively, is woven so as to be perpendicular to the warp or longitudinal threads, respectively. To this end, the weft thread is drawn off a package, on account of which the weft thread may be twisted about its own axis. Such twisting is not a problem when the weft thread is one with a circular cross-sectional shape. However, this may lead to problems when the cross-sectional shape deviates from the circular shape. Therefore, one particularly preferable design embodiment of the invention provides that the at least some longitudinal threads have a flattened, for example rectangular or elliptic cross-sectional shape, and the woven-fabric seam cross threads in particular have a circular cross-sectional shape. However, the use of longitudinal threads having a flattened cross-sectional shape may have yet other advantages. In this way, flattened longitudinal threads have a larger cross-sectional area than longitudinal threads of the same thickness having a circular cross-sectional shape. Furthermore, flattened longitudinal threads provide a larger contact surface on the upper and/or lower side than circular longitudinal threads. This may be of advantage for example in the case of TAD wires which are intended to provide a large contact surface to the fibrous web.

Various possibilities for producing the materially integral connection are conceivable. According to one particularly preferable refinement of the invention it is provided that the materially integral connection is effected by the influence of radiation energy having a specific wavelength or a specific wavelength range, in particular by laser radiation energy. Producing a materially integral connection in this way has the advantage that an effect may take place in a very localized manner, without the entire woven-fabric belt being impinged with temperature, for example. It is particularly conceivable in this context that the wavelength or the wavelength range, respectively, is in the infrared range, in particular in the range from 700 nm to 1200 nm.

It is specifically conceivable that at least in the case of some threads which are connected in a materially integral manner a material which absorbs more radiation energy than the material of the threads has been incorporated at the thread intersection points between the threads prior to the effect of the radiation energy. Such an absorbent material may be present in liquid form, for example, and be sprayed between the parts to be connected. Such a liquid absorbent material is marketed under the "Clearweld" brand by Gentex Corp., for example.

Alternatively thereto, it is conceivable that the longitudinal threads and/or the woven-fabric seam cross threads comprise/comprises a first thread type and a second thread type, wherein the first thread type is from a material which absorbs more radiation energy than the material of the second thread type. Specifically, the threads of the first type may thus be from a material which comprises carbon black and/or color pigments and/or CNT (carbon nanotubes), for example.

In this context it is particularly conceivable that the woven-fabric seam cross threads which at the thread intersection points are connected in a materially integral manner to the longitudinal thread end portions are threads of the first thread type. It is particularly conceivable in this case that the longitudinal threads and the remaining cross threads are threads of the second thread type.

According to one preferred embodiment of the invention it is provided that in the case of at least some of the longitudinal thread end portions, in particular in the case of all longitudinal thread end portions, the float in which the at least one woven-fabric seam cross thread which is connected in a materially integral manner to the longitudinal thread end portion at the thread intersection point runs on the same side of upper and lower side. By way of this design embodiment a materially integral connection is possible in that the effect of the radiation energy for producing the materially integral connection may be applied from a single side. This significantly facilitates and simplifies the production of the woven-fabric belt according to the invention, in particular when the weaving paths of all longitudinal thread end portions are configured in such a design.

In this context, if the longitudinal threads are threads of the second thread type, and the woven-fabric seam cross threads which are connected in materially integral manner are threads of the first thread type, the effect of radiation energy in this case may be performed in order to produce a materially integral connection on one side of upper and lower side, specifically on that side on which the above-mentioned float runs.

Alternatively, it is conceivable that at least some longitudinal threads are threads of the first thread type.

The solution according to the invention is employable in particular in a woven-fabric belt which is formed by only one system of longitudinal threads and/or by only one system of cross threads, since the thread end portions in the case of such woven fabrics are held by other threads so as to be under tensile stress to a lesser degree, and since the thread end portions in the case of such woven fabrics are mutually held by friction locking to a lesser extent.

The woven-fabric belt according to the invention is preferably a woven-fabric belt having a permeability in the range of 450 to 850 cfm, in particular 450 to 750 cfm, and/or a thickness in the range from 0.7 to 1.1 millimeters. Furthermore, the woven-fabric belt is preferably a dryer wire, in particular suitable for use in a drying installation in which the wire is perfused with hot air. Such a dryer wire is usually referred to as a "through-air dryer" wire, or as a TAD wire.

According to one specific design embodiment of the invention it may be provided that in the weaving path of all longitudinal thread end portions the respective thread end is disposed within the woven fabric or on the other side of upper and lower side.

According to one potential specific design embodiment of the invention, the woven-fabric belt is an endless woven-fabric belt which is formed by a flat-woven main woven-fabric portion and the woven-fabric seam portion. Here, the main woven-fabric portion is formed by the longitudinal threads and cross threads which are interwoven therewith and which are referred to as main woven-fabric cross threads. Furthermore, the main woven-fabric portion in the longitudinal extent thereof is delimited by a first and a second face-side portion end. Furthermore, one of the two end-side longitudinal thread end portions of a longitudinal thread is referred to as the first longitudinal thread end portion, and the other of the two end-side longitudinal thread end portions of a longitudinal thread is referred to as the second longitudinal thread end portion, wherein the first longitudinal thread end portion when viewed in the longitudinal direction of the woven fabric protrudes beyond the first face-side portion end of the main woven-fabric portion, and the second longitudinal thread end portion when viewed in the longitudinal direction of the woven-fabric belt protrudes beyond the second face-side portion end. In the case of such an endless woven-fabric belt the two face-side portion ends of the main woven-fabric portion are interconnected by that woven-fabric seam portion that is formed by collecting the first and second longitudinal thread end portions and interweaving the latter with woven-fabric seam cross threads. It should still be noted in this context that each first longitudinal thread end portion is terminated by a first thread end, and each second longitudinal thread end portion is terminated by a second thread end. A refinement of the invention that is based on the previous design embodiment provides in particular that the woven-fabric belt is rendered endless in that first and second longitudinal thread end portions are each gathered in pairs while configuring so-called "meeting points".

Here, the first and second longitudinal thread end portions which are gathered in pairs may in each case be the first and second longitudinal thread end portion of one and the same longitudinal thread. However, it is also conceivable that the first and second longitudinal thread end portions which are gathered in pairs are the first longitudinal thread end portion of a first longitudinal thread and the second longitudinal thread end portion of a second longitudinal thread which is disposed so as to be offset in relation to the first longitudinal thread by at maximum 20, in particular at maximum ten, longitudinal threads.

One further specific refinement of the invention may provide that at least some of the first and second longitudinal thread end portions which are gathered in pairs are collectively interwoven with one or a plurality of woven-fabric seam cross threads. If first and second longitudinal thread end portions which are gathered in pairs are collectively interwoven with one or a plurality of woven-fabric seam cross threads, the length of a meeting point is determined by the number of woven-fabric seam cross threads with which the gathered longitudinal thread end portions are collectively interwoven. The weaving paths of the longitudinal thread end portions which are gathered in pairs, at the location where these threads are collectively interwoven, in particular have the same profile.

It is to be noted in this context that collective interweaving is preferably performed with at maximum ten woven-fabric seam cross threads, preferably with at maximum four woven-fabric seam cross threads. However, it is also conceivable that the longitudinal thread end portions which are gathered in pairs are not collectively interwoven with any woven-fabric seam cross thread.

If at least some of the first and second longitudinal thread end portions which are gathered in pairs are collectively interwoven with at least one woven-fabric seam cross thread, it is particularly conceivable that the at least one collectively interwoven woven-fabric seam cross thread is disposed in the weaving path of the first and in the weaving path of the second longitudinal thread end portion in the last float. Here, it is particularly conceivable that the last float in the weaving path of the first longitudinal thread portion, and the last float in the weaving path of the second longitudinal thread end portion are mutually overlapping at least in portions.

Additionally and/or alternatively, the solution according to the invention is preferably employable in woven-fabric belts which have a "relatively open" weaving structure. Consequently, according to one design embodiment of the invention, this may be a woven-fabric belt which has a thread count of at maximum 60 longitudinal threads per inch, in particular 30 to 60 longitudinal threads per inch, preferably 40 to 55 longitudinal threads per inch, and/or a thread count of at maximum 60 cross threads, in particular per inch, 30 to 60 cross threads per inch, preferably 40 to 55 cross threads per inch. In this context, it is to be noted in particular that such woven-fabric belts in particular have identical thread counts in the woven-fabric seam portion and in the main woven-fabric portion.

One refinement of the invention provides that at least some of the first and second longitudinal thread end portions which are gathered in pairs are collectively interwoven with at maximum six directly adjacent woven-fabric seam cross threads, wherein the collectively interwoven woven-fabric seam cross threads are disposed in the weaving path of the first longitudinal thread end portion in the last float and in the penultimate float directly preceding the last float, and wherein the collectively interwoven woven-fabric seam cross threads are disposed in the weaving path of the second longitudinal thread end portion in the last float and in the penultimate float directly preceding the last float.

Specifically, the woven-fabric seam portion may be woven in a weaving pattern having a longitudinal thread repeat and a cross thread repeat, wherein the longitudinal thread repeat is formed by the equal number of or more woven-fabric seam cross threads to/than the number of woven-fabric seam cross threads with which the first and second longitudinal thread end portions which are gathered in pairs are collectively interwoven. By interweaving the gathered longitudinal thread end portions with common woven-fabric seam cross threads over such relatively short distances, physical properties such as permeability, for example, in the woven-fabric seam region vary to a lesser extent than if collective interweaving extends across more woven-fabric seam cross threads than there are woven-fabric seam cross threads in the longitudinal thread repeat. Preferably, the longitudinal thread repeat of the woven-fabric seam region is the same as that of the main woven-fabric portion, and the cross thread repeat of the woven-fabric seam portion is the same as that of the main woven-fabric portion.

Alternatively thereto, the woven-fabric seam portion may be woven in a weaving pattern having a longitudinal thread repeat and a cross thread repeat, wherein the longitudinal thread repeat is formed by fewer woven-fabric seam cross threads than the number of woven-fabric seam cross threads with which the first and second longitudinal thread end portions which are gathered in pairs are collectively interwoven.

According to a further alternative design embodiment it is also conceivable that at least some of the first and second longitudinal thread end portions which are gathered in pairs are not collectively interwoven with any woven-fabric seam cross thread, wherein the last float in the weaving path of the first longitudinal thread end portion and the last float in the weaving path of the second longitudinal thread end portion are either directly adjacent to one another or are spaced apart by at maximum two directly adjacent woven-fabric seam cross threads. In this context, directly adjacent means that there is no woven-fabric seam cross thread disposed between the two last floats.

By this measure too, intense variation of the physical properties such as, for example, permeability or planarity of the upper and/or lower side in the woven-fabric seam region is counteracted, wherein it has been demonstrated that a larger spacing in the MD direction between the first and second longitudinal thread end portions which are gathered in pairs than the spacing described above entails disadvantageous weakening of the woven-fabric seam and often too large a difference in permeability at this point as compared with other fabric regions. If first and second longitudinal thread end portions which are gathered in pairs are not collectively interwoven with any woven-fabric seam cross threads, the length of a meeting point is determined by the number of woven-fabric seam cross threads which are disposed between the two ends of the weaving paths of the two gathered longitudinal thread end portions.

In order for the strength of the seam to be improved it is purposeful that the points at which the first and second longitudinal thread end portions are gathered in pairs, when viewed in the longitudinal direction of the woven-fabric belt, are disposed so as to be mutually offset for various pairs of gathered first and second longitudinal thread end portions. In this context, it is particularly conceivable that the woven-fabric seam cross threads by which first longitudinal thread end portions are connected in a materially integral manner for dissimilar first longitudinal thread end portions are at least in part provided by dissimilar woven-fabric seam cross threads. It is likewise conceivable that the woven-fabric seam cross threads by which second longitudinal thread end portions are connected in a materially integral manner for dissimilar second longitudinal thread end portions are at least in part provided by dissimilar woven-fabric seam cross threads.

Specifically, the last floats in the weaving path of in each case directly adjacent first and second longitudinal thread end portions, respectively, may be disposed so as to be mutually offset by at least one woven-fabric seam cross thread, in particular by leaving at least one woven-fabric seam cross thread unoccupied therebetween.

In this context, it is conceivable, for example, that the last floats in the weaving path of in each case directly adjacent first longitudinal thread end portions are disposed so as to be mutually offset by at least one longitudinal thread repeat. Likewise, the last floats in the weaving path of in each case directly adjacent second longitudinal thread end portions may be disposed so as to be mutually offset by at least one longitudinal thread repeat.

In this context, the woven-fabric seam cross threads with which a first pair of gathered first and second longitudinal thread end portions is collectively interwoven are preferably offset by a plurality of woven-fabric seam cross threads in relation to the woven-fabric seam cross threads with which a pair of gathered first and second longitudinal thread end portions which is directly adjacent to the first pair is collectively interwoven. If the woven-fabric seam cross threads therein, which are to be connected in a materially integral manner, are of the first type, the possibility is established thereby that the threads of the first type which are to enter into a materially integral connection to the first pair are disposed so as to be spaced apart from the threads of the first type which are to enter into a materially integral connection to the second pair. On account thereof, the rigidity of the woven-fabric belt in the longitudinal direction of the woven-fabric belt may be reduced since a materially integral connection is performed in striped regions which when viewed in the longitudinal direction of the woven-fabric belt are mutually spaced apart.

BRIEF DESCRIPTION OF THE SEVERAL VIEWS OF THE DRAWING

The invention will be discussed in more detail hereunder by means of schematic drawings in which.

DESCRIPTION OF THE INVENTION

Figure 1:
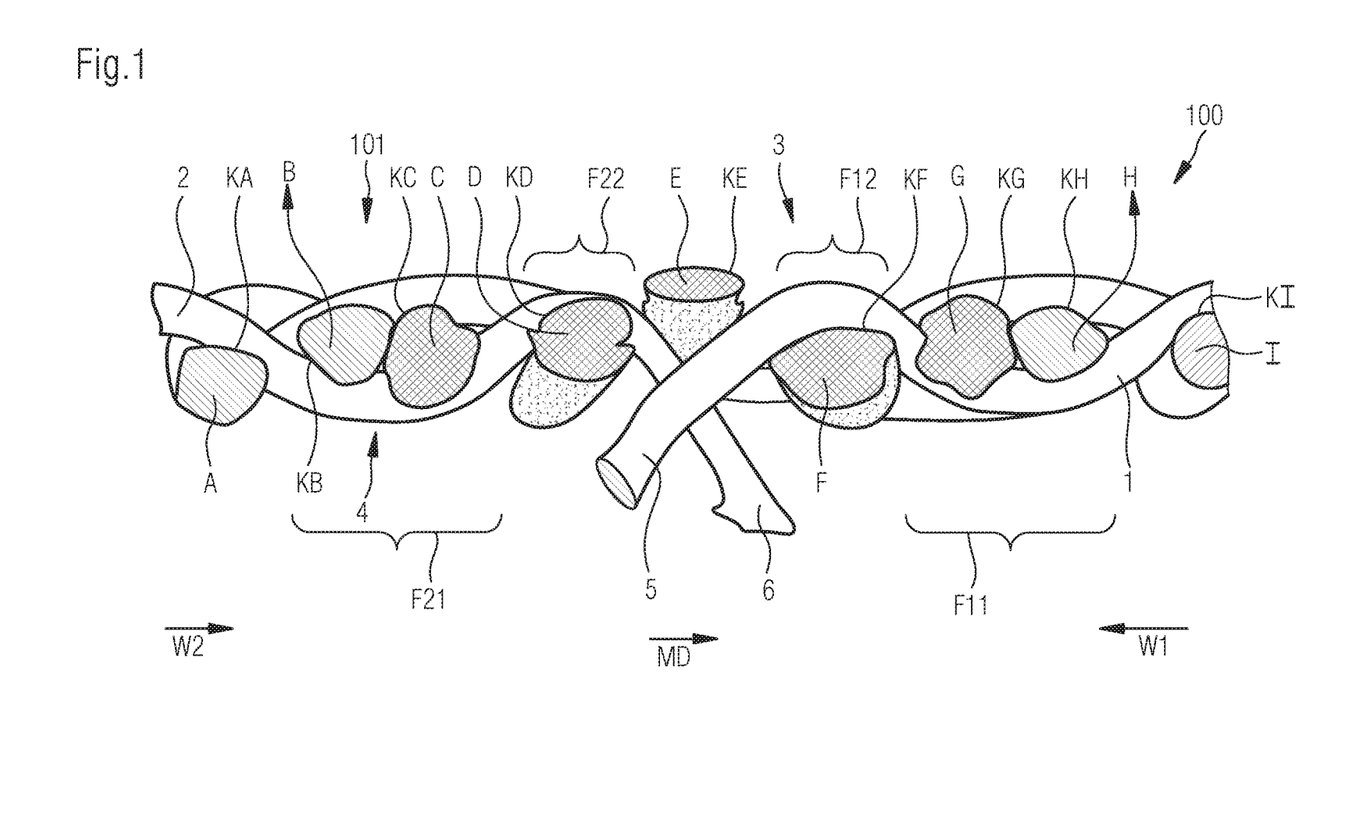
FIG. 1 shows a photograph of a weaving path of two longitudinal thread end portions according to a first embodiment of the invention, in the longitudinal direction of the longitudinal threads.

FIG. 1 shows a photograph of the weaving path of two longitudinal thread end portions 1, 2 which are gathered in pairs, according to a first embodiment of a woven-fabric belt 100 according to the invention, in the longitudinal direction of the longitudinal threads.

The woven-fabric belt 100 has longitudinal threads which are interwoven with cross threads, while configuring thread intersection points KA to KI, and an upper side 3, and a lower side 4 lying opposite thereto. In the intended use of the woven-fabric belt in a paper, cardboard, tissue or non-woven machine, the longitudinal threads extend in the MD direction MD, and the cross threads extend in the CD direction CD of the machine.

The woven-fabric belt 100 here is formed by only one system of longitudinal threads and by only one system of cross threads.

The longitudinal threads when viewed along the length thereof have two end-side longitudinal thread end portions, specifically one first longitudinal thread end portion 1, and one second longitudinal thread end portion 2, wherein each longitudinal thread end portion 1, 2 in terms of the length thereof is delimited by a thread end 5, 6. Presently, the first longitudinal thread end portion 1 is delimited by the first thread end 5, and the second longitudinal thread end portion is delimited by the second thread end 6.

The woven-fabric belt 100 is an endless woven-fabric belt which is formed by a flat-woven main woven-fabric portion (not illustrated) and a partially illustrated woven-fabric seam portion 101. Here, the main woven-fabric portion is formed by the longitudinal threads and by cross threads which are interwoven therewith and are referred to as main woven-fabric cross threads, and the main woven-fabric portion in terms of the longitudinal extent thereof is delimited by a first and a second face-side end portion, wherein the first longitudinal thread end portions 1 in the MD direction protrude beyond the first face-side portion end, and the second longitudinal thread end portions 2 protrude beyond the second portion end. Here, the two face-side portion ends are interconnected by the woven-fabric seam portion. The woven-fabric seam portion 101 is formed by gathering first and second longitudinal thread end portions and interweaving the latter with cross threads which are referred to as woven-fabric seam cross threads, wherein presently the two longitudinal thread end portions 1, 2, and the woven-fabric seam cross threads A to I can be seen.

Figure 2:
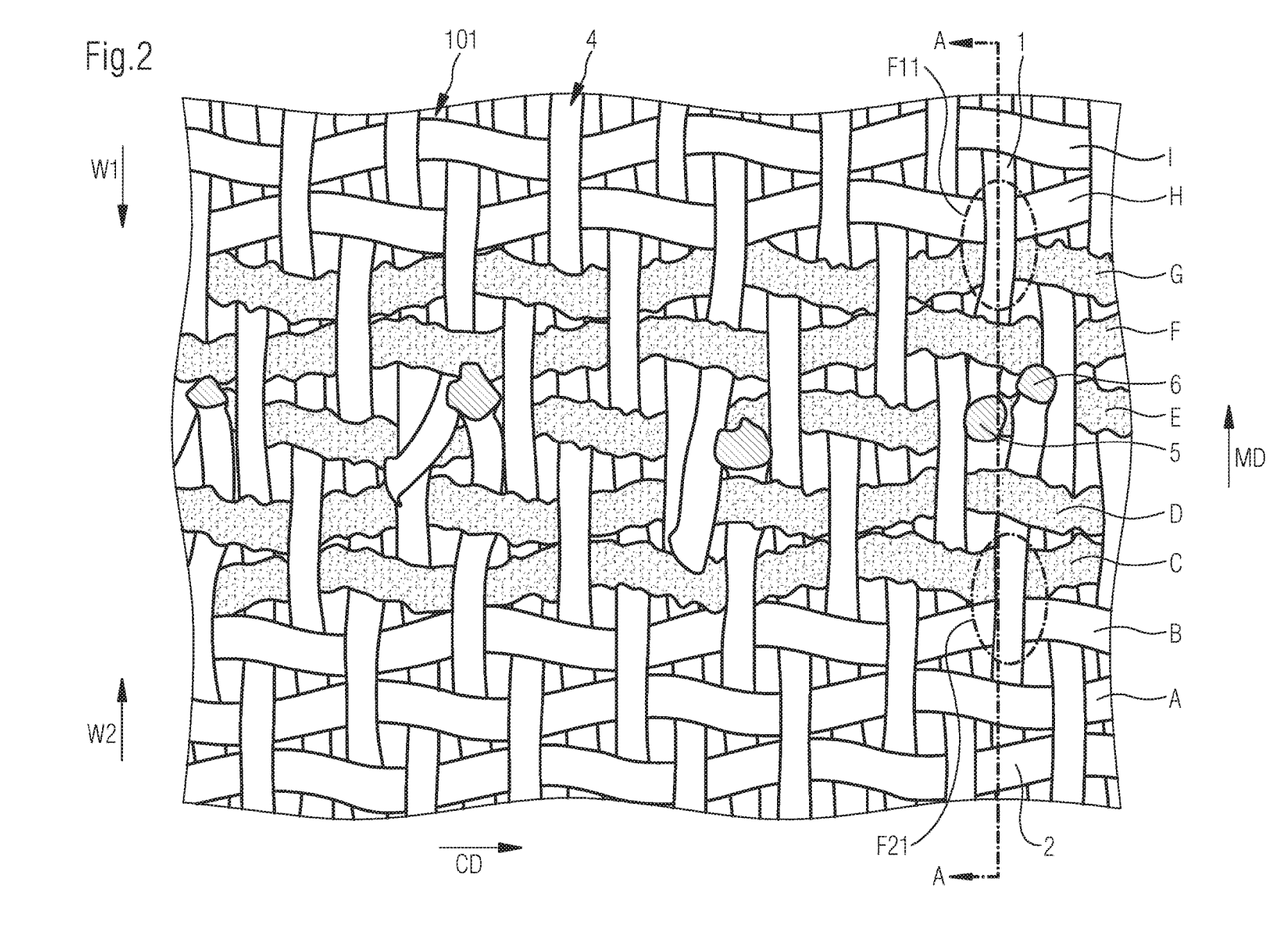
FIG. 2 shows the embodiment of the woven-fabric belt according to the invention of FIG. 1, in an illustration of portions of the woven-fabric seam region in a plan view.

FIG. 2 shows the woven-fabric seam portion 101 of the woven-fabric belt 100 according to the invention of FIG. 1, in an illustration of portions in a plan view, wherein the weaving paths of the two longitudinal thread end portions of FIG. 1 run along the section line A-A.

Presently, the longitudinal threads and thus also the longitudinal thread end portions 1, 2, and the woven-fabric seam cross threads A, B, H, and I, shown in FIG. 1, are threads of the second type. The woven-fabric seam cross threads C to G are threads of the first type, that is to say that these threads absorb more radiation energy of a specific wavelength than the threads of the second type. Presently, the woven-fabric seam cross threads C to G are from a mixture containing PET and CNT (carbon nanotubes), the material of the threads of the second type not containing any CNT.

As can be seen from the illustration of FIG. 1, the two longitudinal thread end portions 1, 2 during interweaving with the woven-fabric seam cross threads A to I each follow a weaving path, viewed along which the respective longitudinal thread end portion 1, 2 in the direction W1, W2 to the thread end 5, 6 thereof, repeatedly and alternatingly configures floats F11, F12, F21, F22 on the upper side 3 and on the lower side 4. It can be seen that each of the floats F11 to F22 is formed in that the longitudinal thread end portion 1, 2, running on the same side of upper side 3 and lower side 4, intersects one or a plurality of directly adjacent woven-fabric seam cross threads. Specifically, the first longitudinal thread end portion 1 forms the float 11 in that the former, running on the lower side 4, intersects the two directly adjacent woven-fabric seam cross threads G and H, and forms the float F12 in that said longitudinal thread end portion 1, running on the upper side 3, intersects the woven-fabric seam cross thread F. Furthermore, the second longitudinal thread end portion 2 forms the float F21 in that the former, running on the lower side 4, intersects the two directly adjacent woven-fabric seam cross threads B and C, and forms the float F22 in that said longitudinal thread end portion 2, running on the upper side 3, intersects the woven-fabric seam cross thread E.

Here, the weaving path of the first longitudinal thread end portion 1 runs in the direction W1 to the first thread end 5, the weaving path of the second longitudinal thread end portion 2 likewise running in the direction W2 to the second thread end 6.

As can be seen, the first longitudinal thread end portion 1, in the weaving path thereof running in the direction W1, before the first thread end 5 configures the last float F12, and subsequent to the last float F12 before the first thread end 5, runs from the upper side 3 to the lower side 4. Furthermore, the second longitudinal thread end portion 2, in the weaving path thereof running in the direction W2, before the second thread end 6 configures the last float F12, and subsequent to the last float F12, before the second thread end 5, runs from the upper side 3 to the lower side 4. Neither longitudinal thread end portion 1, 2 after the last float F12, F22 is interwoven with any further woven-fabric seam cross thread.

According to the invention, the first longitudinal thread end portion 1 at the thread intersection point KG is connected in a materially integral manner to the woven-fabric seam cross thread G, wherein the thread intersection point KG is disposed in the float F11 lying before the last float F12 in the weaving path. Presently, the float 11 is that float which in the weaving path of the first longitudinal thread end portion 1 directly precedes the last float 12, and is specifically the penultimate float 11 in the weaving path of the first longitudinal thread end portion 1.

Additionally thereto, the first longitudinal thread end portion 1 at the thread intersection points KF and KE is connected in a materially integral manner to the woven-fabric seam cross threads F and E, wherein these connections often cannot be produced in a readily reproducible manner.

Furthermore, according to the invention, the second longitudinal thread end portion 2 at the thread intersection point KC is connected in a materially integral manner to the woven-fabric seam cross thread C, wherein the thread intersection point KC is disposed in the float F21 which in the weaving path lies before the last float F22. Presently, the float 21 is that float which in the weaving path of the second longitudinal thread end portion 2 directly precedes the last float 22, and is specifically the penultimate float 21 in the weaving path of the second longitudinal thread end portion 2.

Additionally thereto, the second longitudinal thread end portion 2 at the thread intersection points KD and KE is connected in a materially integral manner to the woven-fabric seam cross threads D and E, wherein these connections often cannot be produced in a readily reproducible manner.

This means that in the weaving path of the two longitudinal thread end portions 1, 2 the respective longitudinal thread end portion 1, 2 is connected in a materially integral manner to further woven-fabric seam cross threads F, E and D, E, respectively, at the thread intersection points KF, KE, KD.

Presently the materially integral connection at the thread intersection points KC to KG is a welded connection, produced by the effect of infrared radiation energy from the wavelength range of 700 to 1200 nm.

As can be seen from the illustration of FIG. 1, the two first and second longitudinal thread end portions 1, 2 which are gathered in pairs are not collectively interwoven with any woven-fabric seam cross thread A to I, wherein presently the last float F12 in the weaving path of the first longitudinal thread end portion 1, and the last float F22 in the weaving path of the second longitudinal thread portion 2 are mutually spaced apart by the woven-fabric seam cross thread E.

In the present exemplary embodiment, both the longitudinal threads as well as the woven-fabric seam cross threads have a circular cross-sectional shape.

Figure 3:
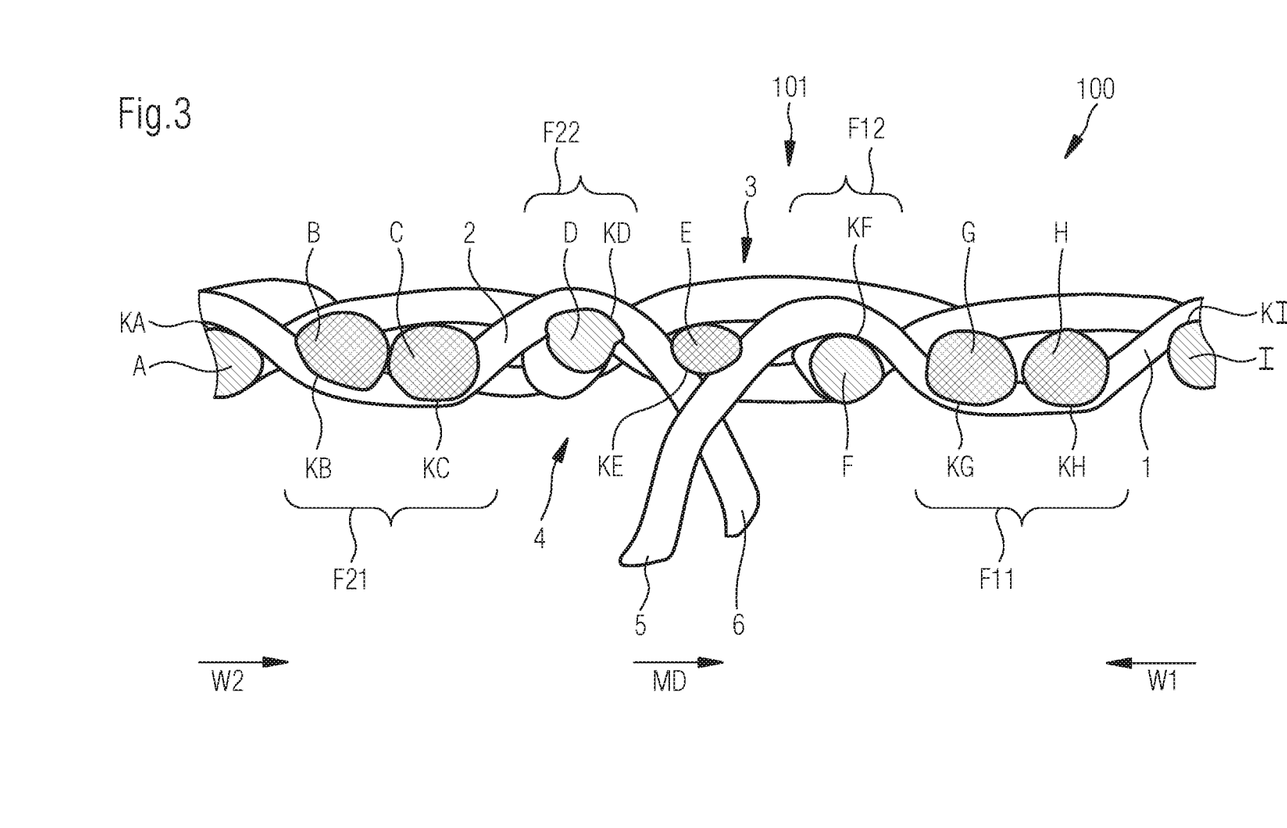
FIG. 3 shows a photograph of a weaving path of two longitudinal thread end portions according to a second embodiment of the invention, in the longitudinal direction of the longitudinal threads.

FIG. 3 shows a photograph of the weaving path of two longitudinal thread end portions 1, 2 which are gathered in pairs, according to a second embodiment of a woven-fabric belt 100 according to the invention, in the longitudinal direction of the longitudinal threads.

Hereunder, only the points of difference to the first embodiment shown in FIGS. 1 and 2 will be addressed.

In the case of the embodiment of FIG. 3 the woven-fabric seam cross threads G and H are threads of the first type, such that in the weaving path of the first longitudinal thread end portion 1 both woven-fabric seam cross threads of the penultimate float F11 are threads of the first type, which at the thread intersection points KG and KH are connected in a materially integral manner to the first longitudinal thread end portion 1. Furthermore, the only woven-fabric seam cross thread F of the last float F12 in the weaving path of the first longitudinal thread end portion 1 is a thread of the second type.

Furthermore, the woven-fabric seam cross threads B and C are threads of the first type, such that in the weaving path of the second longitudinal thread end portion 2 both woven-fabric seam cross threads of the penultimate float F21 are threads of the first type, which at the thread intersection points KB and KC are connected in a materially integral manner to the second longitudinal thread end portion 2. Furthermore, the only woven-fabric seam cross thread D of the last float F22 in the weaving path of the second longitudinal thread end portion 2 is a thread of the second type.

FIG. 4 shows various embodiments of weaving paths of two longitudinal thread end portions which are gathered in pairs, according to further embodiments of woven-fabric belts according to the invention. The illustration of FIG. 4 shows the weaving paths in the longitudinal direction of the longitudinal threads.

In the case of all embodiments of FIG. 4, the woven-fabric belt has an upper side 3 and a lower side 4 lying opposite thereto.

Figure 4A:
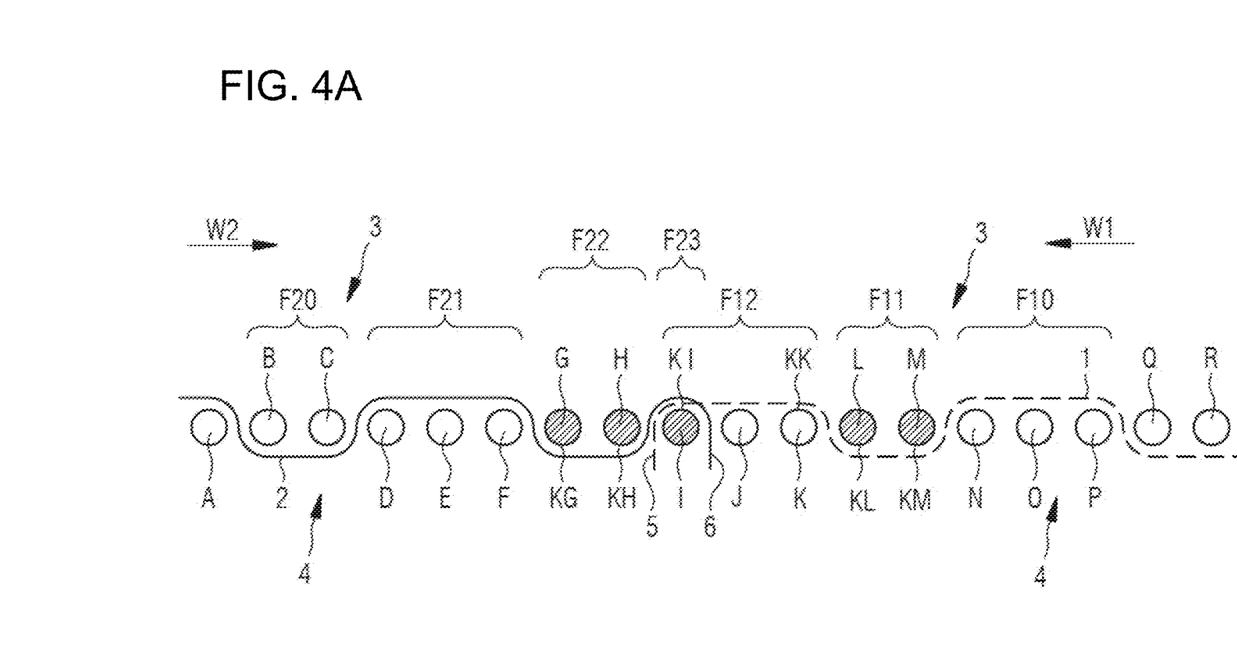
FIG. 4 shows various embodiments of weaving paths of two longitudinal thread end portions which are gathered in pairs, according to further embodiments of the invention, in the longitudinal direction of the longitudinal threads.

FIG. 4a shows an embodiment of the weaving paths of two longitudinal thread end portions 1, 2 which are gathered in pairs, during interweaving with woven-fabric seam cross threads A to R in part of a woven-fabric seam portion. It can be seen that floats F10, F11, F12, F20, F21, F22, F23 of dissimilar lengths are formed in the weaving path of both longitudinal thread end portions. It can furthermore be seen that the woven-fabric seam cross threads A to F, J, K, and N to R, and the two longitudinal thread end portions 1, 2, are threads of the second type, and that the woven-fabric seam cross threads G, H, I, and L, M are threads of the first type. Here, the weaving path of the first longitudinal thread end portion 1 runs in the direction toward that thread end thereof that is referred to as the first thread end 5, in the direction W1, the weaving path of the second longitudinal thread end portion 2 likewise running in the direction toward that thread end thereof that is referred to as the second thread end 6, in the direction W2.

The weaving path of the first longitudinal thread end portion 1 has a float F11 running on the lower side 4 and having the float length 2, and floats F10, F12 running on the upper side 3 and having the float length three, wherein the float F11 in the weaving path of the first longitudinal thread end portion 1 is the penultimate float before the first thread end 5, the float F12 providing the last float.

According to the invention, in the weaving path of the first longitudinal thread end portion 1, in at least one float F22 lying before the last float F12, the longitudinal thread end portion 1 at the thread intersection points KL, KM is connected in a materially integral manner to at least one woven-fabric seam cross thread L, M. Specifically, the first longitudinal thread end portion 1 at the thread intersection points KL, KM is connected in a materially integral manner to the woven-fabric seam cross threads L and M lying in the penultimate float F11. Additionally, the first longitudinal thread end portion 1 in the last float F12 at the thread intersection point KI is connected in a materially integral manner to the woven-fabric seam cross thread I. It can further be seen that the woven-fabric seam cross threads L, M to which the first longitudinal thread end portion 1 is connected in a materially integral manner at the thread intersection points KL, KM are disposed in a float F11 which in relation to the other floats F12, F10 is of shorter length.

When observing the weaving path of the second longitudinal thread end portion 2, it can be seen that the latter has floats F20 and F22 running on the lower side 4 and having the float length 2, a float F21 running on the upper side 3 and having the float length three, and a float F23 running on the upper side 3 and having the float length one, wherein the float F22 in the weaving path of the second longitudinal thread end portion 2 is the penultimate float before the second thread end 6, the float F23 providing the last float.

According to the invention, in the weaving path of the second longitudinal thread end portion 2, in at least one float F22 lying before the last float F23, the second longitudinal thread end portion 2 at the thread intersection point KG, KH is connected in a materially integral manner to at least one woven-fabric seam cross thread G, H. Specifically, the second longitudinal thread end portion 2 at the thread intersection points KG, KH is connected in a materially integral manner to the woven-fabric seam cross threads G and H lying in the penultimate float F22. Additionally, the second longitudinal thread end portion 2 in the last float F23 at the thread intersection points KI is connected in a materially integral manner to the woven-fabric seam cross thread I. It can further be seen that the woven-fabric seam cross threads G, H to which the second longitudinal thread end portion 2 is connected in a materially integral manner at the thread intersection points KG, KH are disposed in a float F22 which in relation to the float F21 is of shorter length.

Furthermore, the first and second longitudinal thread end portions 1, 2 which are gathered in pairs are collectively interwoven with the woven-fabric seam cross threads I, wherein the collectively interwoven woven-fabric seam cross thread I in the weaving path of both longitudinal thread portions 1, 2 are disposed in the last float F12 (for the first longitudinal thread end portion 1) and F23 (for the second longitudinal thread end portion 2). The weaving paths of the two longitudinal thread end portions 1, 2 when collectively interwoven with the woven-fabric seam cross thread I have the same profile.

Figure 4B:
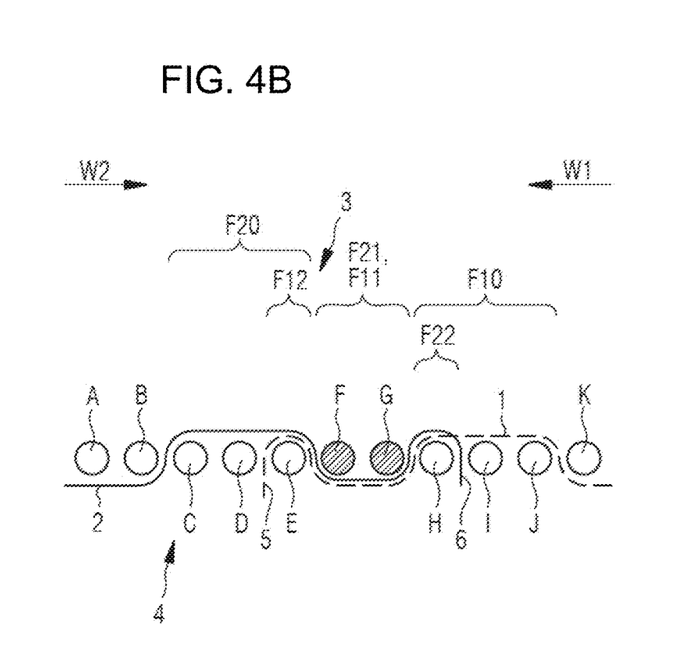

FIG. 4b shows a further embodiment of the weaving paths of two longitudinal thread end portions 1, 2 which are gathered in pairs during interweaving with woven-fabric seam cross threads A to K in part of a woven-fabric seam portion. It can be seen that floats F10, F11, F12, F20, F21, F22 of dissimilar lengths are formed in the weaving path of both longitudinal thread end portions. It can further be seen that the woven-fabric seam cross threads A to E and H to K, and the two longitudinal thread end portions 1, 2 are threads of the second type, and the woven-fabric seam cross threads F and G are threads of the first type. The weaving path of the first longitudinal thread end portion 1 here runs in the direction toward the thread end thereof which is referred to as the first thread end 5, in the direction W1, the weaving path of the second longitudinal thread end portion 2 likewise running toward the thread end thereof which is referred to as the second thread end 6, in the direction W2.

The weaving path of the first longitudinal thread end portion 1 has a float F11 running on the lower side 4 and having the float length 2, a float F10 running on the upper side 3 and having the float length three, and a float F12 running on the upper side 3 and having the float length one, wherein the float F11 in the weaving path of the first longitudinal thread end portion 1 is the penultimate float before the thread end 5, the float F12 providing the last float.

According to the invention, in the weaving path of the first longitudinal thread end portion 1, in at least one float F11 lying before the last float F12, the longitudinal thread end portion 1 at the at least one thread intersection point KF, KG is connected in a materially integral manner to at least one woven-fabric seam cross thread F, G. Specifically, the first longitudinal thread end portion 1 at the thread intersection points KF, KG is connected in a materially integral manner to the woven-fabric seam cross threads F and G lying in the penultimate float F11. It can further be seen that the woven-fabric seam cross threads F, G to which the first longitudinal thread end portion 1 is connected in a materially integral manner at the thread intersection points KF, KG are disposed in a float F11 which in relation to the other floats F10, with the exception of the last float F12, is of shorter length.

When observing the weaving path of the second longitudinal thread end portion 2, the latter has a float F21 running on the lower side 4 and having a float length 2, a float F20 running on the upper side 3 and having a float length three, and a float F22 running on the upper side 3 and having a float length one, wherein the float F21 in the weaving path of the second longitudinal thread end portion 2 is the penultimate float before the second thread end 6, the float F22 providing the last float.

According to the invention, in the weaving path of the second longitudinal thread end portion 2, in at least one float F21 lying before the last float F22, the second longitudinal thread end portion 2 at least at one thread intersection point KF, KG is connected in a materially integral manner to at least one woven-fabric seam cross thread F, G. Specifically, the second longitudinal thread end portion 2 at the thread intersection points KF, KG is connected in a materially integral manner to the woven-fabric seam cross threads F and G lying in the penultimate float F21. It can furthermore be seen that the woven-fabric seam cross threads F, G to which the second longitudinal thread end portion 2 at the thread intersection points KF, KG is connected in a materially integral manner are disposed in a float F21 which in relation to the float F20 is of shorter length.

Furthermore, the first and second longitudinal thread end portions 1, 2 which are gathered in pairs are collectively interwoven with the woven-fabric seam cross threads E to H, wherein the collectively interwoven woven-fabric seam cross threads F, G are disposed in the weaving path of both longitudinal thread end portions 1, 2 in the penultimate float F11 (for the first longitudinal thread end portion 1) and F21 (for the second longitudinal thread end portion 2), and the woven-fabric seam cross thread E is disposed in the weaving path of the first longitudinal thread end portion 1 in the last float F12, and the woven-fabric seam cross thread H is disposed in the weaving path of the second longitudinal thread end portion 2 in the last float F22, respectively. The weaving paths of the two longitudinal thread end portions 1, 2 when collectively interwoven with the woven-fabric seam cross threads E to H have the same profile.

Figure 4C:
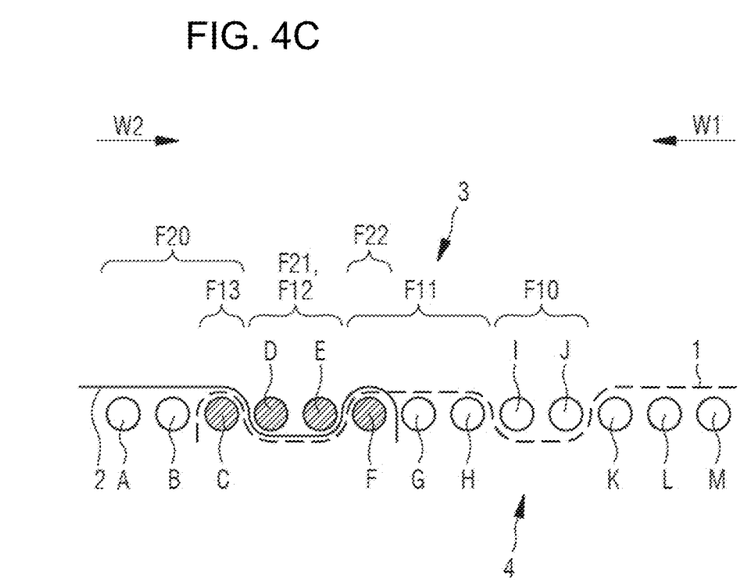

FIG. 4C shows yet a further embodiment of the weaving paths of two longitudinal thread end portions 1, 2 which are gathered in pairs during interweaving with woven-fabric seam cross threads A to M in part of a woven-fabric seam portion. It can be seen that floats F10, F11, F12, F13, F20, F21, F22 of dissimilar lengths are formed in the weaving path of both longitudinal thread end portions. It can furthermore be seen that the woven-fabric seam cross threads A, B, and G to M, and the two longitudinal thread end portions 1, 2 are threads of the second type, and that the woven-fabric seam cross threads C to F are threads of the first type. The weaving path of the first longitudinal thread end portion 1 here runs in the direction toward the thread end thereof which is referred to as the first thread end 5, in the direction W1, the weaving path of the second longitudinal thread end portion 2 likewise running toward the thread end thereof which is referred to as the second thread end 6, in the direction W2.

The weaving path of the first longitudinal thread end portion 1 has floats F10, F12 running on the lower side 4 and having the float length 2, a float F11 running on the upper side 3 and having the float length three, and a float F13 running on the upper side 3 and having the float length one, wherein the float F12 in the weaving path of the first longitudinal thread end portion 1 is the penultimate float before the thread end 5, the float F13 providing the last float.

According to the invention, in the weaving path of the first longitudinal thread end portion 1, in at least one float F12 lying before the last float F13, the longitudinal thread end portion 1 at at least one thread intersection point KD, KE is connected in a materially integral manner to at least one woven-fabric seam cross thread D, E. Specifically, the first longitudinal thread end portion 1 at the thread intersection points KD, KE is connected in a materially integral manner to the two woven-fabric seam cross threads D and E lying in the penultimate float F12. It can furthermore be seen that the woven-fabric seam cross threads D, E to which the first longitudinal thread end portion 1 at the thread intersection points KD, KE is connected in a materially integral manner are disposed in a float F12 which in relation to the other floats F11, with the exception of the last float F13, is of shorter length.

When observing the weaving path of the second longitudinal thread end portion 2 the latter has a float F21 running on the lower side 4 and having the float length 2, a float F20 running on the upper side 3 and having the float length three, and a float F22 running on the upper side 3 and having the float length one, wherein the float F21 in the weaving path of the second longitudinal thread end portion 2 is the penultimate float before the second thread end 6, the float F22 providing the last float.

According to the invention, in the weaving path of the second longitudinal thread end portion 2, in at least one float F21 lying before the last float F22, the second longitudinal thread end portion 2 at at least one thread intersection point KD, KE is connected in a materially integral manner to at least one woven-fabric seam cross thread D, E. Specifically, the second longitudinal thread end portion 2 at the thread intersection points KD, KE is connected in a materially integral manner to the two woven-fabric seam cross threads D and E lying in the penultimate float F21. It can furthermore be seen that the woven-fabric seam cross threads D, E to which the second longitudinal thread end portion 2 at the thread intersection points KD, KE is connected in a materially integral manner are disposed in a float F21 which in relation to the float F20 is of shorter length.

Furthermore, the first and second longitudinal thread end portions 1, 2 which are gathered in pairs are collectively interwoven with the woven-fabric seam cross threads C to F, wherein the collectively interwoven woven-fabric seam cross threads D, E are disposed in the weaving path of both longitudinal thread end portions 1, 2 in the penultimate float F12 (for the first longitudinal thread end portion 1) and F21 (for the second longitudinal thread end portion 2), and the woven-fabric seam cross thread C is disposed in the weaving path of the first longitudinal thread end portion 1 in the last float F13, and the woven-fabric seam cross thread F is disposed in the weaving path of the second longitudinal thread end portion 2 in the last float F22, respectively. The weaving paths of the two longitudinal thread end portions 1, 2 when collectively interwoven with the woven-fabric seam cross threads C to F have the same profile.

The invention claimed is:

1. A woven-fabric belt for a machine producing or processing a fibrous web, the woven-fabric belt comprising:
    longitudinal threads and woven-fabric seam cross threads being interwoven and forming thread intersection points, mutually opposite upper and lower sides and a woven-fabric seam portion;
    each of said longitudinal threads having a length and two end-side longitudinal thread end portions with a respective thread end along said length;
    said woven-fabric seam portion being formed by interweaving said longitudinal thread end portions with said woven-fabric seam cross threads;
    at least some of said longitudinal thread end portions, upon interweaving with said woven-fabric cross threads, following a weaving path along which said respective longitudinal thread end portion in a direction toward said thread end thereof repeatedly and alternatingly configuring floats on said upper side and on the lower side;
    one of said floats on said lower side being disposed between two directly adjacent floats on said upper side and one of said floats on said upper side being disposed between two directly adjacent floats on said lower side;
    said floats including a last float before said thread end in said weaving path being formed on one of said upper and lower sides;
    said longitudinal thread end portion, subsequent to said last float before said thread end, changing from one of said upper and lower sides to the other of said upper and lower sides;
    said longitudinal thread end portion, at least at one of said thread intersection points, being connected in a materially integral manner to one of said woven-fabric cross threads;
    said at least one thread intersection point, having said longitudinal thread end portion connected in a materially integral manner to said one woven-fabric seam cross thread, being disposed in at least one of said floats lying before said last float in said weaving path; and
    at least one of said at least some longitudinal threads or at least some woven-fabric seam cross threads have a flattened cross-sectional shape along a complete length thereof.

2. The woven-fabric belt according to claim 1, wherein in said weaving path of said at least some longitudinal thread end portions, said at least one thread intersection point at which said respective longitudinal thread end portion is connected in a materially integral manner to a woven-fabric seam cross thread, is disposed in at least one of said floats being one of six or one of four floats directly preceding said last float.

3. The woven-fabric belt according to claim 1, wherein in said weaving path of said at least some longitudinal thread end portions, said at least one thread intersection point at which said respective longitudinal thread end portion is connected in a materially integral manner to a woven-fabric seam cross thread, is disposed in a float being a penultimate float directly preceding said last float.

4. The woven-fabric belt according to claim 1, wherein floats of dissimilar lengths are formed in said weaving path of said at least some longitudinal thread end portions, and said at least one thread intersection point, at which said respective longitudinal thread end portion is connected in a materially integral manner to a woven-fabric seam cross thread, is disposed in a float having a shorter length than other floats.

5. The woven-fabric belt according to claim 1, wherein at least one of said further woven-fabric seam cross threads, being connected in a materially integral manner to said longitudinal thread end portion at said thread intersection point, is disposed in said last float.

6. The woven-fabric belt according to claim 1, wherein said at least some longitudinal threads have a flattened cross-sectional shape and said woven-fabric cross threads have a circular cross-sectional shape.

7. The woven-fabric belt according to claim 6, wherein at least one of said longitudinal threads or said woven-fabric seam cross threads include a first thread type and a second thread type, said thread types are formed of different materials, and said material of said first thread type absorbs more radiation energy than said material of said second thread type.

8. The woven-fabric belt according to claim 7, wherein said woven-fabric seam cross threads, being connected in a materially integral manner to said longitudinal thread end portions at said thread intersection points, are threads of said first thread type, and said longitudinal threads and remaining cross threads are threads of said second thread type.

9. The woven-fabric belt according to claim 1, wherein said materially integral connection has characteristic of being effected by an influence of radiation energy or laser radiation energy.

10. The woven-fabric belt according to claim 1, wherein the woven-fabric belt is formed by at least one of only one system of longitudinal threads or only one system of cross threads.

11. The woven-fabric belt according to claim 1, wherein:
the woven-fabric belt is an endless woven-fabric belt formed by a flat-woven main woven-fabric portion and said woven-fabric seam portion,
said main woven-fabric portion is formed by said interwoven longitudinal threads and main woven-fabric cross threads;
said main woven-fabric portion has a longitudinal extent being delimited by first and second face-side portion ends;
at least some of said longitudinal threads have at least one of:
first longitudinal thread end portions with a first thread end protruding beyond said first face-side portion end in the MD direction, or
second longitudinal thread end portions with a second thread end protruding beyond said second face-side portion end; and
said face-side portion ends are interconnected by said woven-fabric seam portion being formed by collecting and interweaving said first and second longitudinal thread end portions with said woven-fabric seam cross threads.

12. The woven-fabric belt according to claim 11, wherein the woven-fabric belt is endless and said first and second longitudinal thread end portions are each gathered in pairs to form meeting points.

13. The woven-fabric belt according to claim 12, wherein at least some of said first and second longitudinal thread end portions being gathered in pairs are collectively interwoven with one or a plurality of woven-fabric seam cross threads.

14. The woven-fabric belt according to claim 12, wherein at least some of said first and second longitudinal thread end portions being gathered in pairs are collectively interwoven with at least one woven-fabric seam cross thread, and said at least one collectively interwoven woven-fabric seam cross thread is disposed in said weaving path of said first longitudinal thread portion and in said weaving path of said second longitudinal thread portion in said last float.

15. The woven-fabric belt according to claim 12, wherein at least some of said first and second longitudinal thread end portions being gathered in pairs are collectively interwoven with at most six directly adjacent woven-fabric seam cross threads, said collectively interwoven woven-fabric seam cross threads are disposed in said weaving path of said first longitudinal thread end portion in said last float and in said float directly preceding said last float, and said collectively interwoven woven-fabric seam cross threads are disposed in said weaving path of said second longitudinal thread end portion in said last float and in said float directly preceding said last float.

16. The woven-fabric belt according to claim 1, which further comprises at least one of:
woven-fabric seam cross threads interconnecting said first longitudinal thread end portions in a materially integral manner for dissimilar first longitudinal thread end portions provided by dissimilar woven-fabric seam cross threads, or
woven-fabric seam cross threads interconnecting said second longitudinal thread end portions in a materially integral manner for dissimilar second longitudinal thread end portions provided by dissimilar woven-fabric seam cross threads.

* * * * *